US008776318B2

(12) United States Patent
Yamaguchi

(10) Patent No.: US 8,776,318 B2
(45) Date of Patent: Jul. 15, 2014

(54) SLIDE-TILT MECHANISM

(75) Inventor: Akira Yamaguchi, Ichihara (JP)

(73) Assignee: Mitsubishi Steel Mfg. Co. Ltd., Tokyo (JP)

( * ) Notice: Subject to any disclaimer, the term of this patent is extended or adjusted under 35 U.S.C. 154(b) by 93 days.

(21) Appl. No.: 13/510,348

(22) PCT Filed: Nov. 29, 2010

(86) PCT No.: PCT/JP2010/071265
§ 371 (c)(1),
(2), (4) Date: May 17, 2012

(87) PCT Pub. No.: WO2011/068089
PCT Pub. Date: Jun. 9, 2011

(65) Prior Publication Data
US 2012/0222268 A1 Sep. 6, 2012

(30) Foreign Application Priority Data
Dec. 1, 2009 (JP) ................................ 2009-273956

(51) Int. Cl.
*E05F 1/08* (2006.01)
*G06F 1/16* (2006.01)

(52) U.S. Cl.
USPC ............... 16/302; 16/293; 16/362; 455/575.4

(58) Field of Classification Search
USPC ........... 16/302, 362, 363, 364, 352, 350, 366, 16/368, 371, 293, 294, 295, 296; 455/575.3, 575.4; 379/433.12; 361/679.12
See application file for complete search history.

(56) References Cited

U.S. PATENT DOCUMENTS 4,960,256 A * 10/1990 Chihara et al. ............. 248/286.1
7,319,892 B2 * 1/2008 Kato ......................... 455/575.4
(Continued)

FOREIGN PATENT DOCUMENTS

JP 2005-210649 A 8/2005
JP 2007-074411 A 3/2007
(Continued)

OTHER PUBLICATIONS

Abstract and Machine English Translation of 2007-074411 A published Mar. 22, 2007.
(Continued)

*Primary Examiner* — Jeffrey O Brien
(74) *Attorney, Agent, or Firm* — Ladas & Parry LLP

(57) ABSTRACT

A slide/tilt mechanism is provided to include a base plate; a slide plate which is slid between a closed position and an open position with respect to the base plate; a guide plate which supports the slide plate to make the slide plate movable; a tilt mechanism which tilts the slide plate with respect to the base plate by inclining the guide plate with respect to the base plate; an elastic member which actuates the slide plate in a slide direction and a tilt direction; and a tilt restriction member which engages the tilt mechanism to restrict the inclination of the guide plate when the slide plate is slid from the closed position to the open position, and disengages the tilt mechanism to permit the inclination of the guide plate when the slide plate reaches the open position.

4 Claims, 8 Drawing Sheets

(56) References Cited

U.S. PATENT DOCUMENTS

| | | | |
|---|---|---|---|
| 7,916,473 B2* | 3/2011 | Jang | 361/679.55 |
| 8,018,714 B2* | 9/2011 | Luke et al. | 361/679.01 |
| 8,081,449 B2* | 12/2011 | Lin et al. | 361/679.56 |
| 8,108,017 B2* | 1/2012 | Jang et al. | 455/575.4 |
| 8,243,430 B2* | 8/2012 | Ahn et al. | 361/679.27 |
| 2005/0164753 A1 | 7/2005 | Kato | |
| 2008/0174942 A1* | 7/2008 | Yang et al. | 361/680 |
| 2009/0227301 A1* | 9/2009 | Lindvall | 455/575.4 |
| 2009/0286573 A1* | 11/2009 | Jang et al. | 455/566 |
| 2010/0035669 A1* | 2/2010 | Jang et al. | 455/575.4 |
| 2010/0218343 A1* | 9/2010 | Cheng et al. | 16/297 |

FOREIGN PATENT DOCUMENTS

| | | |
|---|---|---|
| JP | 2009-027520 A | 2/2009 |
| JP | 2009-071511 A | 4/2009 |
| JP | 2009-260815 A | 11/2009 |

OTHER PUBLICATIONS

Abstract and Machine English Translation of 2009-260815 A published Nov. 5, 2009.

Abstract of 2005-210649 published Aug. 4, 2005.

Abstract and Machine English Translation of 2009-071511 published Apr. 2, 2009.

Abstract and Machine English Translation of 2009-027520 published Feb. 5, 2009.

* cited by examiner

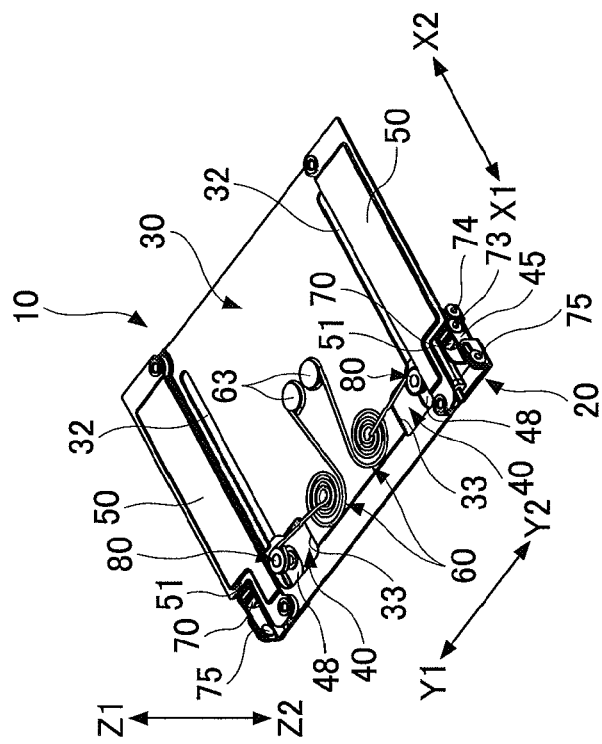
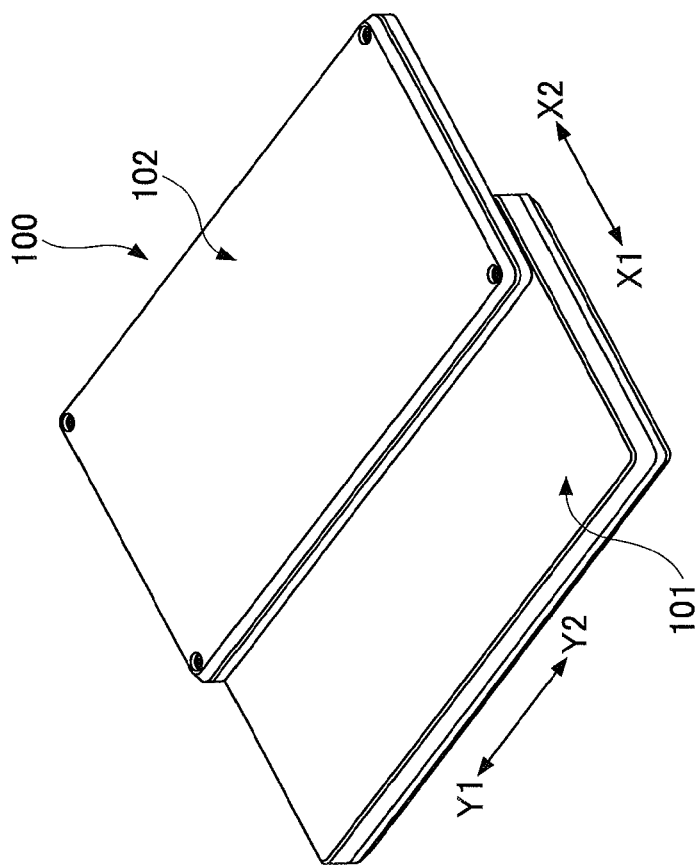

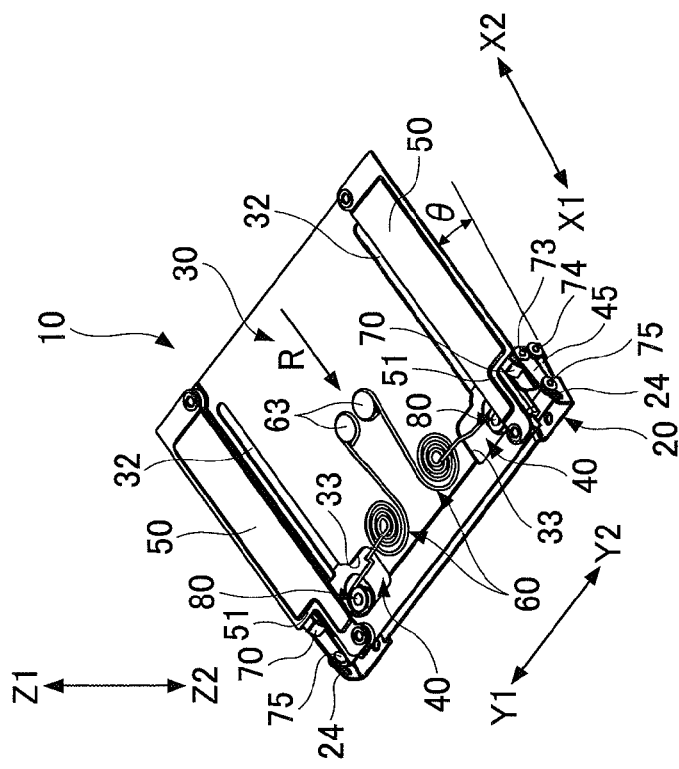
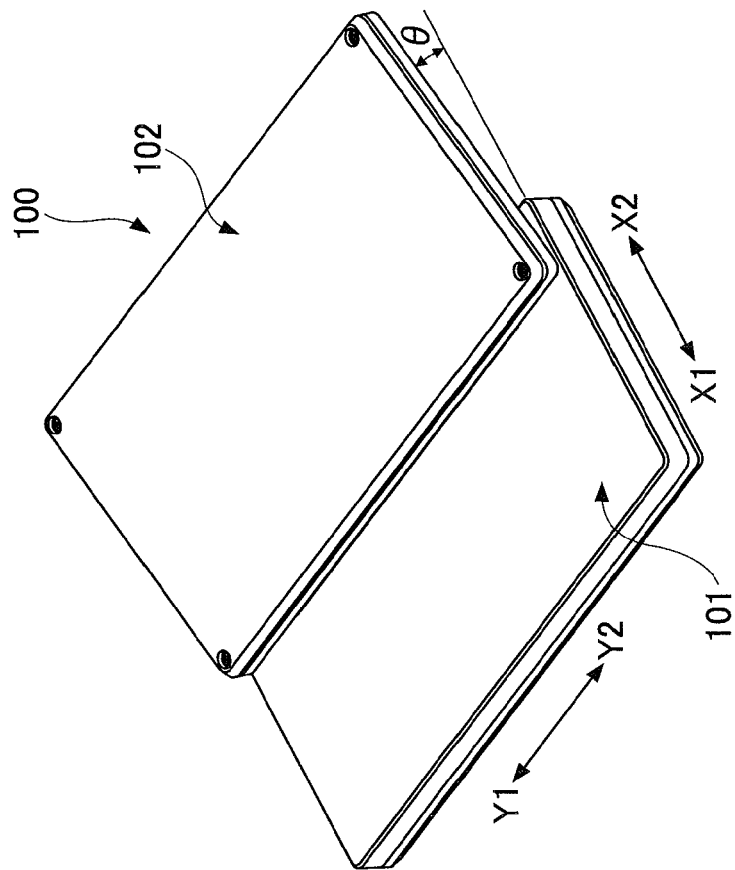

SLIDE-TILT MECHANISM

RELATED APPLICATION INFORMATION

This application is a 371 of International Application PCT/JP2010/071265 filed 29 Nov. 2010 entitled "Slide-Tilt Mechanism", which was published on 9 Jun. 2011, with International Publication Number WO 2011/068089 A1, and which claims priority from Japanese Patent Application 2009-273956 filed 1 Dec. 2009, the content of which is incorporated herein by reference.

TECHNICAL FIELD

The present disclosure generally relates to a slide/tilt mechanism, and more particularly to a slide/tilt mechanism which is adapted to perform slide operations and tilt operations.

BACKGROUND ART

As an example of electronic devices, there is known a mobile phone which is arranged so that a second housing in which a liquid crystal display part and other parts are disposed is able to slide relative to a first housing in which ten keys and other parts are disposed. In the mobile phone of this kind, a slide mechanism is incorporated in order to enable the slide operation of the housings. For example, Patent Document 1 listed below discloses an example of the slide mechanism of this kind.

In recent years, mobile phones having multiple functions have been developed. There is known a mobile phone adapted to receive a television broadcasting signal and use a liquid crystal display part of the mobile phone to display an image of the received signal. In a case in which it is desired to view an image displayed on the liquid crystal display part for a comparatively long time, if a slide mechanism in which the second housing can slide to the first housing only in a horizontal direction is used, the visibility of the image on the liquid crystal display part is low.

To eliminate the problem, Patent Documents 2 and 3 listed below disclose a mobile phone including a tilt mechanism arranged to permit the second housing in which the liquid crystal display part is disposed to be inclined to the first housing, in order to improve the visibility of the image on the liquid crystal display part.

RELATED ART DOCUMENTS

Patent Documents

Patent Document 1: Japanese Laid-Open Patent Publication No. 2005-210649
Patent Document 2: Japanese Laid-Open Patent Publication No. 2009-071511
Patent Document 3: Japanese Laid-Open Patent Publication No. 2009-027520

DISCLOSURE OF THE INVENTION

Problem to be Solved by the Invention

However, a conventional tilt mechanism is arranged such that an operator has to manually rotate the second housing relative to the first housing to cause the second housing to be inclined or tilted relative to the first housing. Hence, it is difficult to provide the ease of operation for the operator.

In one aspect, the present disclosure provides a slide/tilt mechanism which is adapted with a simple structure to provide increased operability.

Means for Solving the Problem

In an embodiment for solving the above-described problems, the present disclosure provides a slide/tilt mechanism including: a base plate; a slide plate which is slid between a closed position and an open position with respect to the base plate; a guide plate which supports the slide plate to make the slide plate movable; a tilt mechanism which tilts the slide plate with respect to the base plate by inclining the guide plate with respect to the base plate; an elastic member which actuates the slide plate both in a slide direction and a tilt direction; and a tilt restricting member which engages the tilt mechanism to restrict the inclination of the guide plate by the tilt mechanism when the slide plate is slid from the closed position to the open position, and disengages the tilt mechanism to permit the inclination of the guide plate in the tilt direction by the tilt mechanism when the slide plate reaches the open position.

Effect of the Invention

According to the slide/tilt mechanism of the present disclosure, it is possible to perform continuously a slide operation to move the slide plate horizontally with respect to the base plate and a tilt operation to tilt the slide plate with respect to the base plate by one manipulation.

BRIEF DESCRIPTION OF THE DRAWINGS

FIGS. 4A and 4B are views for explaining operations of the slide/tilt mechanism of the present embodiment in which FIG. 4A is a perspective view of the electronic device incorporating the slide/tilt mechanism and FIG. 4B is a perspective view of the slide/tilt mechanism (in a closed condition).

FIGS. 5A and 5B are views for explaining operations of the slide/tilt mechanism of the present embodiment in which FIG. 5A is a perspective view of the electronic device incorporating the slide/tilt mechanism and FIG. 5B is a perspective view of the slide/tilt mechanism (in an open condition).

FIGS. 6A and 6B are views for explaining operations of the slide/tilt mechanism of the present embodiment in which FIG. 6A is a perspective view of the electronic device incorporating the slide/tilt mechanism and FIG. 6B is a perspective view of the slide/tilt mechanism (in a tilt condition).

BEST MODE FOR CARRYING OUT THE INVENTION

A description will be given of embodiments of the present disclosure with reference to the accompanying drawings.

Figure 1:
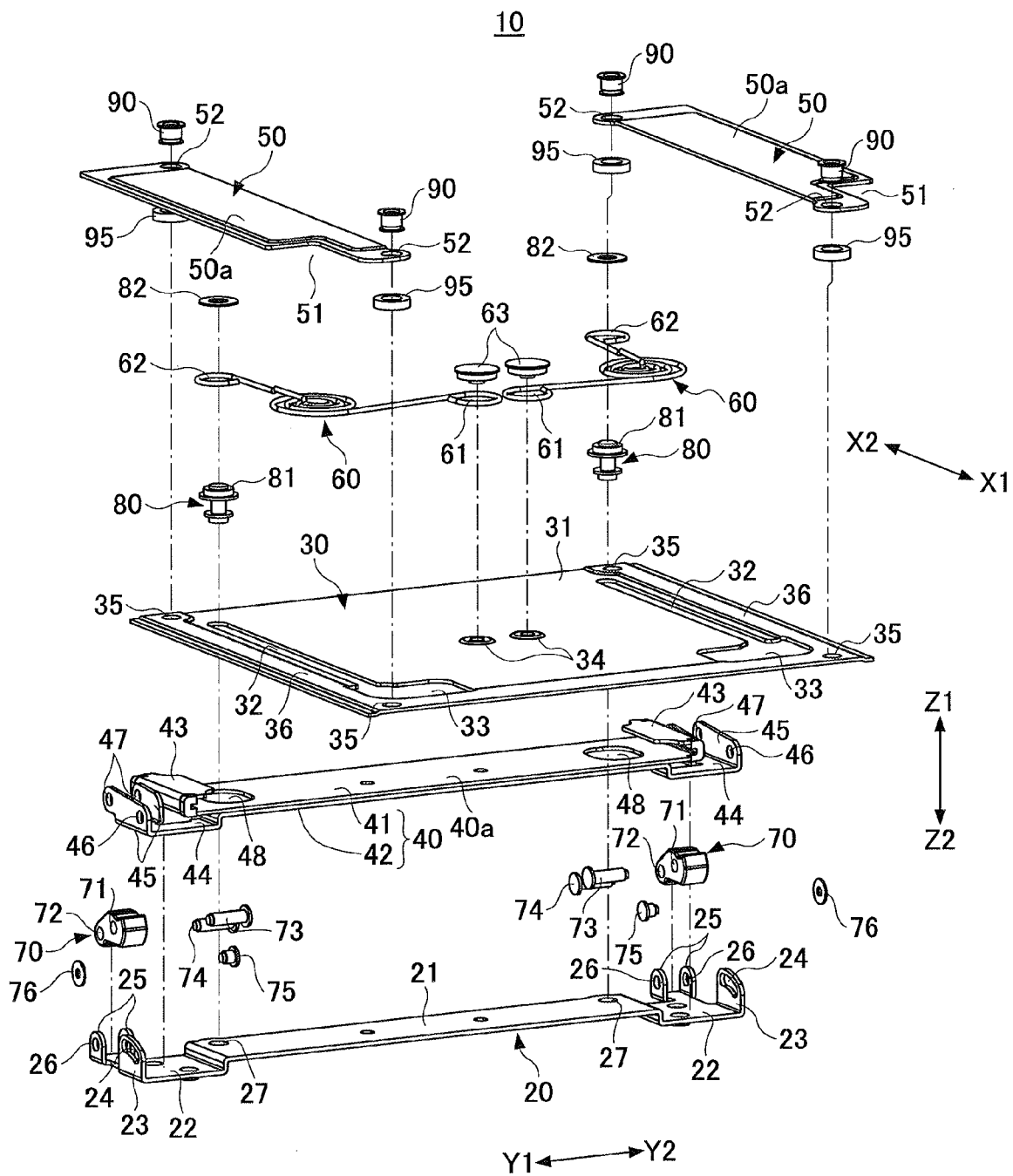
FIG. 1 is an exploded perspective view of a slide/tilt mechanism which is one embodiment of the present disclosure.
Figure 2:
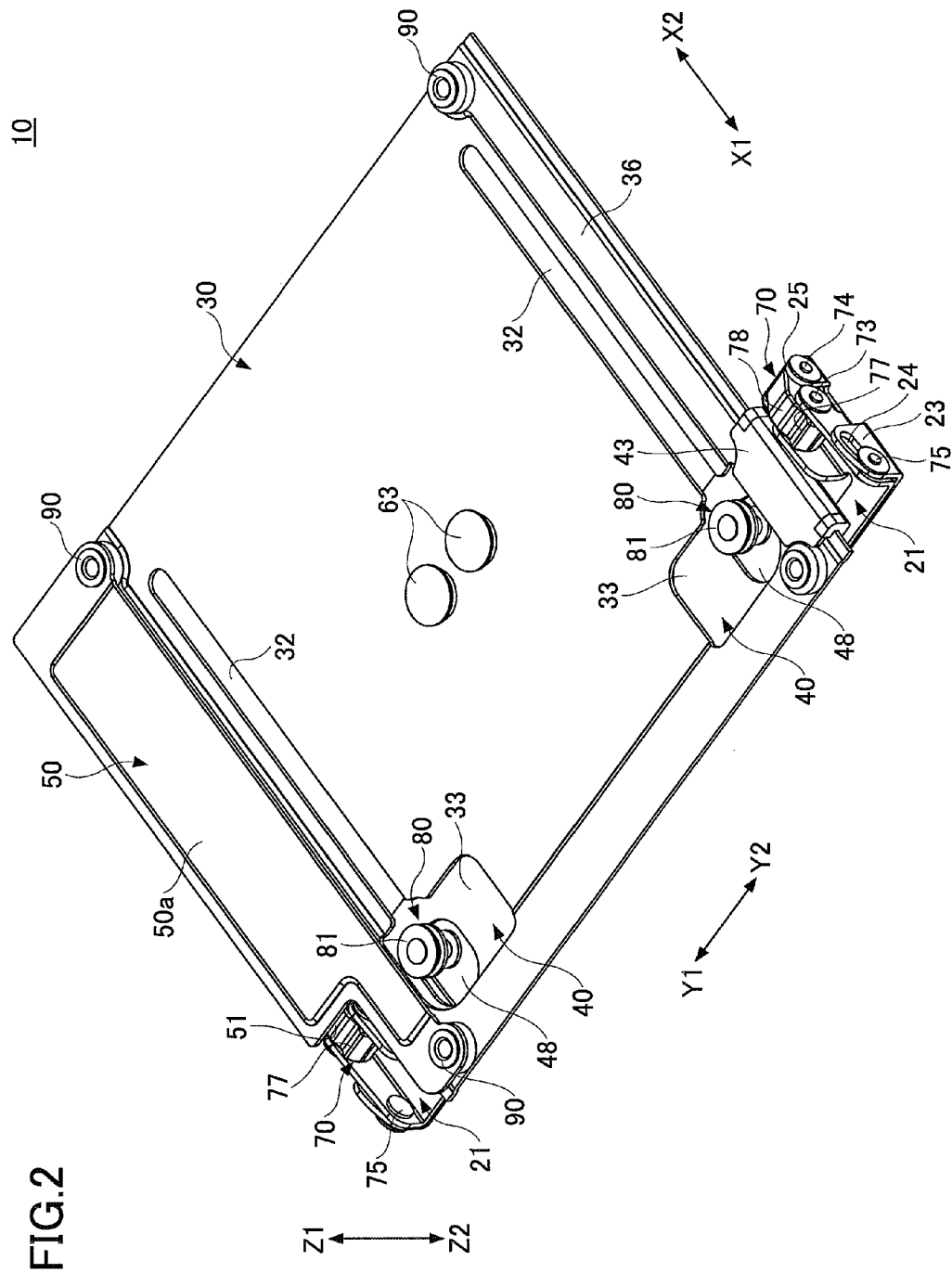
FIG. 2 is a perspective view of the slide/tilt mechanism of the present embodiment when viewed from an upper position.
Figure 3:
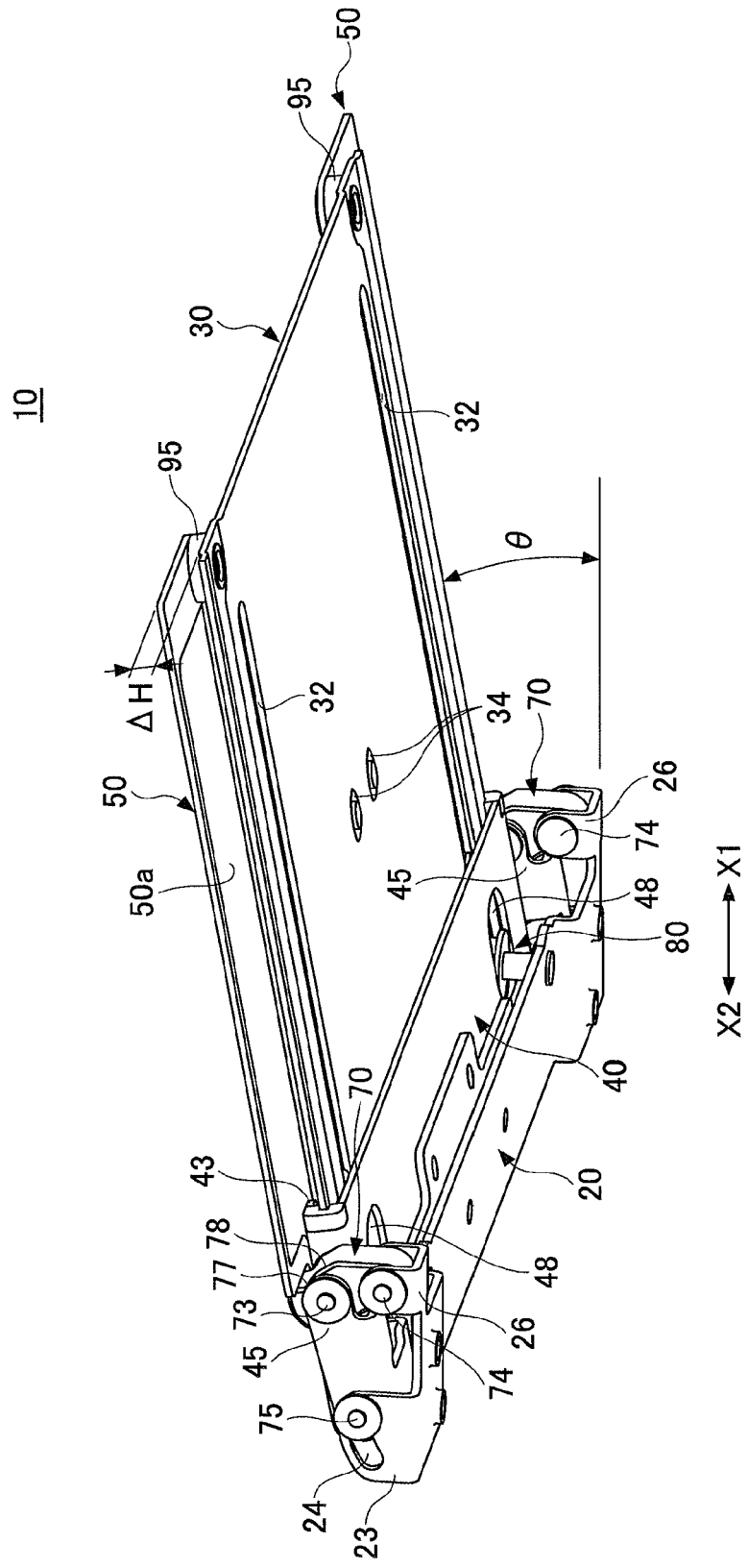
FIG. 3 is a perspective view of the slide/tilt mechanism of the present embodiment when viewed from a lower position.

FIGS. 1 to 3 show a slide/tilt mechanism 10 which is one embodiment of the present disclosure. FIG. 1 is an exploded perspective view of the slide/tilt mechanism 10. FIG. 2 is a perspective view of the slide/tilt mechanism 10 when viewed from an upper position. FIG. 3 is a perspective view of the slide/tilt mechanism when viewed from a lower position. FIGS. 2 and 3 show a state in which a slide plate 30 is tilted relative to a base plate 20. FIG. 2 shows a state of the slide/tilt mechanism in which a tilt restricting plate 50 provided on the side in the direction indicated by the arrow Y2 is removed.

Figure 7:
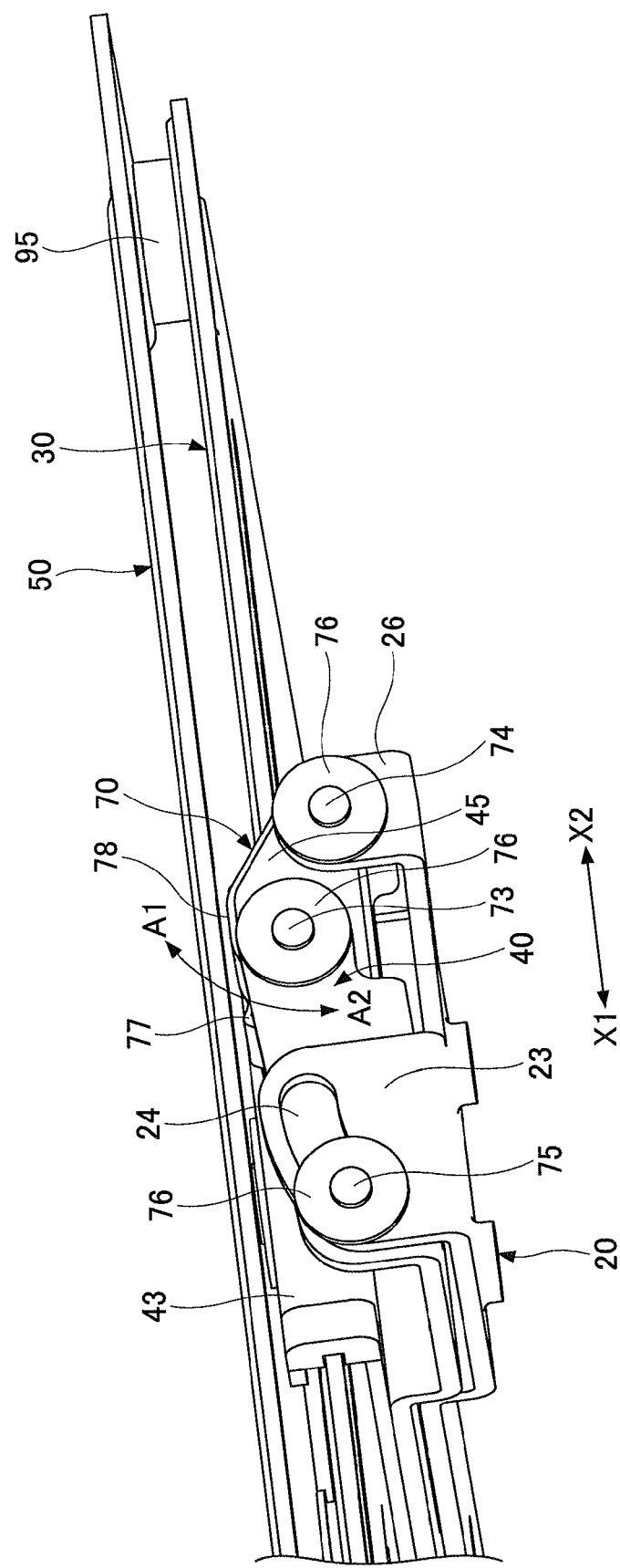
FIG. 7 is an enlarged perspective view of a portion of the slide/tilt mechanism of the present embodiment near a pin in the middle of a slide operation.

The slide/tilt mechanism 10 is arranged to generally include the base plate 20, the slide plate 30, a guide plate 40, tilt restricting plates 50, torsion springs 60, and a tilt mechanism. This slide/tilt mechanism 10 is applicable to, for example, an electronic device 100 as shown in FIGS. 5A, 6A and 7, which is arranged so that a second housing 102 is capable of performing a slide operation (movement) and a tilt operation (inclination) relative to a first housing 101.

The base plate 20 is fixed to the first housing 101 which is a fixed-end component of the electronic device 100. The base plate 20 includes a body part 21 in the shape of an elongated plate which extends in a Y1/Y2 direction indicated by the arrows Y1 and Y2 (which direction will be called a lateral direction). A step part 22 is formed on each of the sides of the body part 21, and a bent part 23 and bearing parts 25 are formed in each of the step parts 22.

The bent part 23 and the bearing parts 25 are formed by bending each of the ends of the body part 21 at right angles upward by press forming. The bent part 23 includes a slot 24 which is formed in the shape of a crescent and extends in a slide direction indicated by the arrows X1 and X2. An engaging pin 75 which will be described later is inserted in the slot 24.

A shaft hole 26 (in which a support pin 74 described later is inserted) is formed in each of the bearing parts 25. A spring fixing hole 27 in which a guide pin 80 described later is fixed is formed in a vicinity of the step part 22 on each side of the body part 21.

The slide plate 30 is a plate member formed in the shape of a rectangle. The slide plate 30 is fixed to the second housing 102 which is a movable-end component of the electronic device 100. A slide groove 32 extending in the slide direction (indicated by the arrows X1 and X2) is formed in each of the sides of the slide plate 30. An opening 33 having a width larger than a width of the slide groove 32 is formed in an end portion of the slide groove 32 in the X1 direction.

One end portion 61 of each of the torsion springs 60 (which are elastic members) is fixed to a respective spring fixing part 34, and the spring fixing parts 34 are formed almost in the middle of the slide plate 30. Fixing holes 35 for fixing the tilt restricting plates 50 are formed in the positions of four corners of the slide plate 30. Two side edge parts 36 of the slide plate 30 are movably held by respective slide holding parts 43 which will be described below.

The guide plate 40 is formed to have a laminated structure in which an upper plate half 41 and a lower plate half 42 are laminated. Specifically, in a body part 40a which is a center portion of the guide plate 40, the upper plate half 41 and the lower plate half 42 are bonded together by welding.

Each of the side parts of the upper plate half 41 is bent to have a U-shaped cross-section so that the slide holding part 43 is formed. The side edge part 36 of the slide plate 30 is movably held by this slide holding part 43 (see FIGS. 2 and 3). Hence, the slide plate 30 is movably held by the slide holding part 43 so that the slide plate 30 is slid in parallel with the guide plate 40.

A step part 44 is formed in each of the side parts of the lower plate half 42. A pair of bearing parts 45 is formed in each of the step parts 44 by bending the step parts 44 at right angles upward. A shaft hole 46 and a shaft hole 47 are formed in the outer bearing part 45. The shaft hole 46 is formed at a position on the X1 direction side and the shaft hole 47 is formed at a position on the X2 direction side opposite to the position where the shaft hole 46 is formed.

Further, another shaft hole 47 is formed in the inner bearing part 45 and this shaft hole 47 is arranged coaxially with the shaft hole 47 formed in the outer bearing part 45 so that the shaft holes 47 face each other. Moreover, an insertion hole 48 is formed in each of the end portions of the guide plate 40, and the guide pins 80 are inserted in the respective insertion holes 48 so that the guide pins 80 are loosely fitted therein.

The tilt restricting plates 50 are disposed on the side portions of the slide plate 30, respectively. The tilt restricting plate 50 is fixed to the slide plate 30 using fixing pins 90. Specifically, spacers 95 are interposed between the tilt restricting plate 50 and the slide plate 30, and then the fixing pins 90 are inserted into the fixing holes 52 and the spacers 95, and the fixing pins 90 are fixed to the fixing holes 35 formed in the slide plate 30.

The tilt restricting plate 50 is arranged so that the tilt restricting plate 50 is fixed to the slide plate 30 to project outward from the side edge part 36 of the slide plate 30. In the following, the portion of the tilt restricting plate 50 which projects outward from the side edge part 36 will be called a link member engaging part 50a (see FIGS. 2 and 3). Further, a cut-out portion is formed in the end of the link member engaging part 50a in the X1 direction. In the following, this cut-out portion will be called a tilt restriction canceling part 51.

As described above, the spacers 95 are interposed between the slide plate 30 and the tilt restricting plate 50. Hence, a gap (as indicated by ΔH in FIG. 3) corresponding to the height of the spacer 95 is formed between the slide plate 30 and the tilt restricting plate 50. This gap is provided to prevent the slide holding part 43 from interfering with the tilt restricting plate 50 when the slide plate 30 is slid relative to the guide plate 40.

The torsion spring 60 functions as an elastic member which actuates the slide plate 30 both in the slide direction and the tilt direction. In this embodiment, a pair of torsion springs 60 is disposed on the front surface of the slide plate 30. One end portion 61 of each of the torsion springs 60 is fixed to the slide plate 30 by fixing a spring fixing pin 63 to the spring fixing part 34. The other end portion 62 of each of the torsion springs 60 is fixed to an upper end portion of the corresponding guide pin 80 (or an upper part of a flange part 81) using a spring fixing washer 82.

The flange part 81 is formed in the upper end portion of the guide pin 80. The diameter of the flange part 81 is larger than the width of the slide groove 32 formed in the slide plate 30 and smaller than the width of the wide area 33. The diameter of the flange part 81 is smaller than the diameter of the insertion hole 48.

The guide pin 80 is fixed to the spring fixing hole 27 formed in the base plate 20. Specifically, the guide pin 80 is fixed to the spring fixing hole 27 as follows. The slide plate 30 and the guide plate 40 are positioned so that the wide area 33 of the slide plate 30 and the insertion hole 48 of the guide plate 40 overlap. In a state in which the slide plate 30 is moved relative to the base plate 20 in the X2 direction (see FIG. 2), the guide pin 80 is fixed to the spring fixing hole 27.

In the fixed state, the leading edge of the guide pin 80 projects upward from the slide plate 30. The end portion 62 of the torsion spring 60 is fixed to the position where the guide pin 80 projects upward from the slide plate 30.

The position for fixing the guide pin 80 is set as the position where the guide pin 80 engages with the slide groove 32 formed in the slide plate 30 when the slide plate 30 is moved in the slide direction (or the direction indicated by the arrows X1 and X2) relative to the base plate 20. Namely, when the slide plate 30 is slid with respect to the base plate 20, the guide pin 80 is moved within the slide groove 32.

The diameter of the flange part 81 formed in the upper end portion of the guide pin 80 is larger than the width of the slide groove 32, and the slide plate 30 at this time is slid while the slide plate 30 is engaged with the flange part 81. Hence, the slide plate 30 does not displace upward (in the direction indicated by the arrow Z1) from the base plate 20 when the slide plate 30 is slid with respect to the base plate 20.

Next, the tilt mechanism to tilt (or incline) the slide plate 30 with respect to the base plate 20 will be described. The tilt mechanism functions to tilt the slide plate 30 with respect to the base plate 20 by inclining the guide plate 40 with respect to the base plate 20. The tilt mechanism is arranged to include the bent part 23 and the bearing parts 25, both formed in the base plate 20, the guide plate 40, link members 70, support pins 73, support pins 74, and engaging pins 75.

Figure 8:
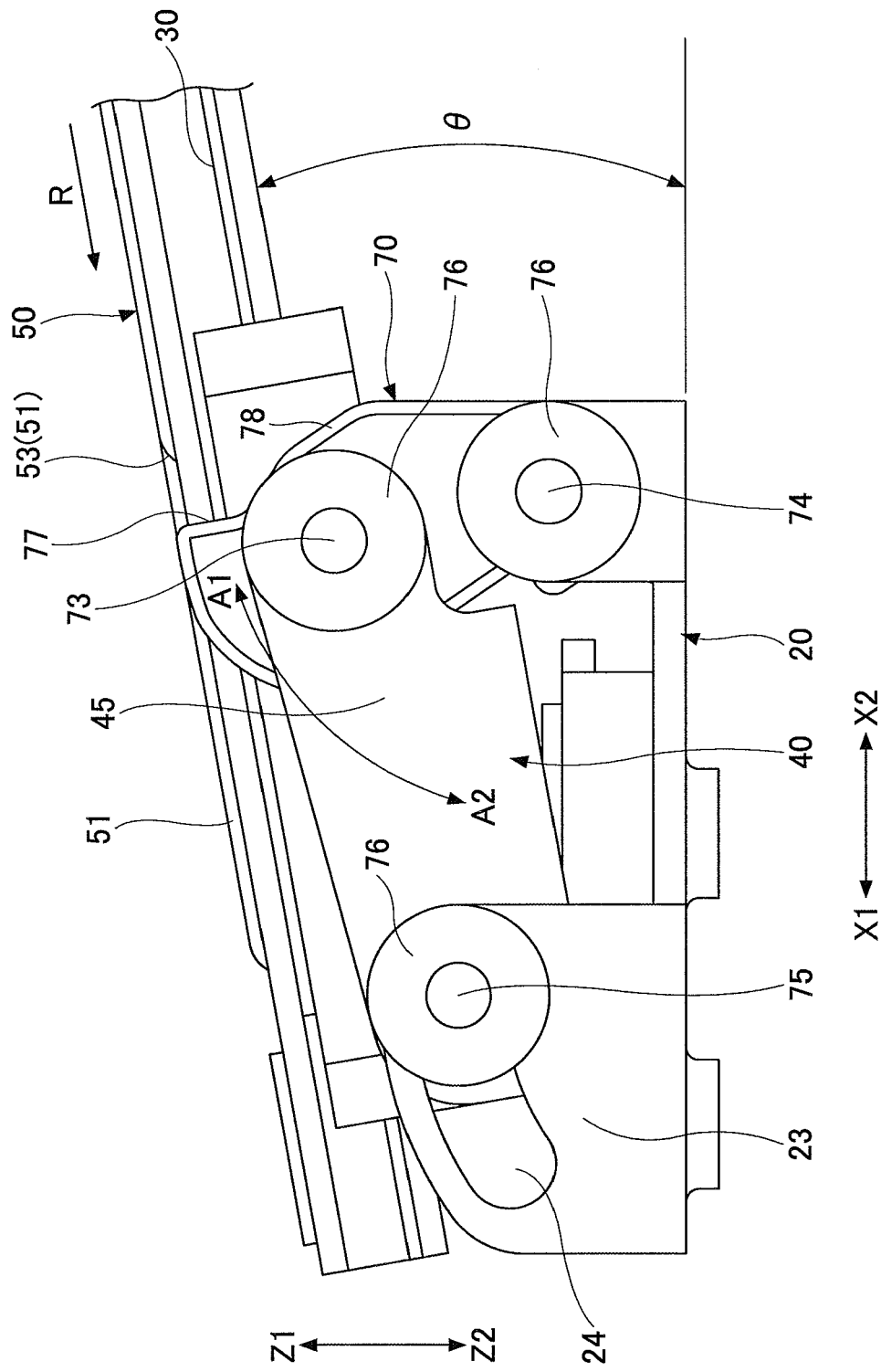
FIG. 8 is an enlarged side view of the portion of the slide/tilt mechanism of the present embodiment near the pin in a tilt condition.

The link member 70 is a lever-like component having a length corresponding to the tilt amount of the slide plate 30 to the base plate 20. A pair of shaft holes 71 and 72 is formed in the link member 70. Further, as shown in FIGS. 3 and 8, an engaging part 77 and a sliding contact surface 78 are formed in the link member 70.

The link member 70 functions as a link that connects the base plate 20 and the guide plate 40 together. Connection of the link member 70 and the guide plate 40 is performed as follows. First, the link member 70 is placed in the space between the pair of bearing parts 45 formed in each of the side parts of the guide plate 40. At this time, the link member 70 and the bearing parts 45 are positioned to make the shaft hole 71 formed in the link member 70 and the shaft hole 46 formed in the bearing parts 45 coaxial with each other.

Subsequently, the support pin 73 is inserted into the shaft hole 46 and the shaft hole 71, and a fixing washer 76 (in FIG. 1, only one fixing washer is illustrated) is attached to the end portion of the support pin 73 outwardly extending from the outer bearing part 45. This allows the link member 70 to be rotatable around the support pin 73 with respect to the guide plate 40. In addition, the rotational direction of the link member 70 around the support pin 74 is indicated by the arrows A1 and A2 in FIGS. 7 and 8.

On the other hand, connection of the link member 70 and the base plate 20 is performed as follows. First, the link member 70 is placed in the space between the bearing parts 25 formed in each of the side parts of the base plate 20. At this time, the link member 75 and the bearing parts 25 are positioned so that the shaft hole 72 formed in the link member 70 and the shaft holes 26 formed in the bearing parts 25 coaxial with each other.

Subsequently, the support pin 74 is inserted into the shaft holes 26 and the shaft hole 72, and a fixing washer 76 is attached to the end portion of the support pin 73 outwardly extending from the outer bearing part 25. This allows the link member 70 to be rotatable around the support pin 74 with respect to the base plate 20.

Moreover, the base plate 20 and the guide plate 40 are connected together by the engaging pin 75. Namely, the slot 24 is formed in the bent part 23 of the base plate 20 and the shaft hole 46 is formed in the outer bearing part 45 of the guide plate 40. When the engaging pin 75 is attached, positioning is performed such that the shaft hole 46 and the slot 24 confront each other. Subsequently, the engaging pin 75 is inserted into the hole 46 and the slot 24, and the fixing washer 76 is attached to the end portion of the engaging pin 75 outwardly projecting from the outer bearing part 45.

Accordingly, the base plate 20 and the guide plate 40 are directly connected to each other by the engaging pin 75. As described above, the slot 24 has the shape of a crescent and extends in the slide direction (the direction indicated by the arrows X1 and X2), and the engaging pin 75 is movable within the slot 24 in the X1 or X2 direction.

The above-described tilt mechanism (in which the component parts are assembled) is arranged so that, in conjunction with the sliding of the slide plate 30, the link member 70 is connectable with either the tilt restricting plate 50 (the link member engaging part 50a) or the tilt restriction canceling part 51.

When the link member 70 engages the link member engaging part 50a (in the state as shown in FIG. 7), the link member 70 is rotated in the A2 direction and the sliding contact surface 78 of the link member 70 is engaged with (or in contact with) the back surface of the link member engaging part 50a.

On the other hand, when the link member 70 engages the tilt restriction canceling part 51, the engagement of the link member 70 and the link member engaging part 50a is canceled because the tilt restriction canceling part 51 is a cut-out portion. Hence, the link member 70 at this time is rotatable in the A1 direction (or in the state as shown in FIG. 2).

Next, operation of the above-described slide/tilt mechanism 10 will be described.

Figure 4B:
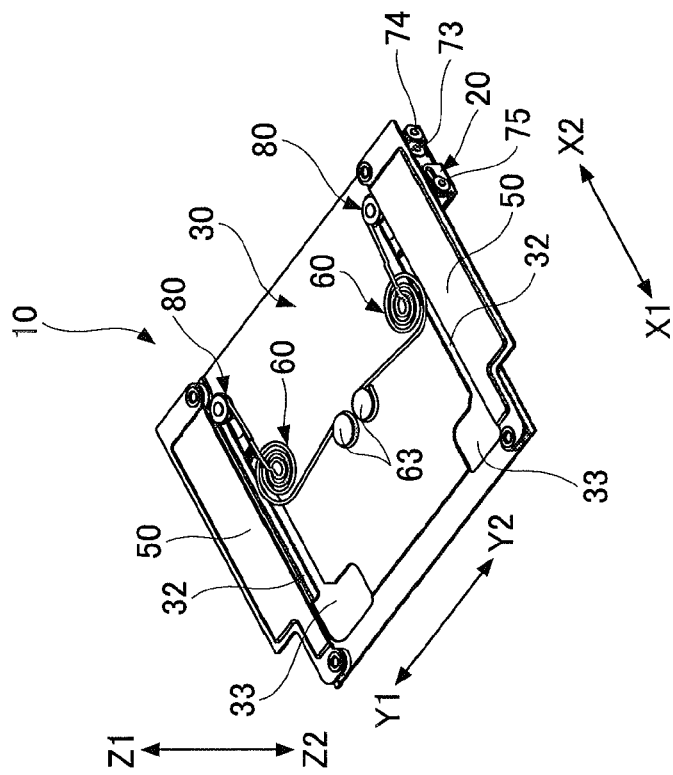
Figure 4A:
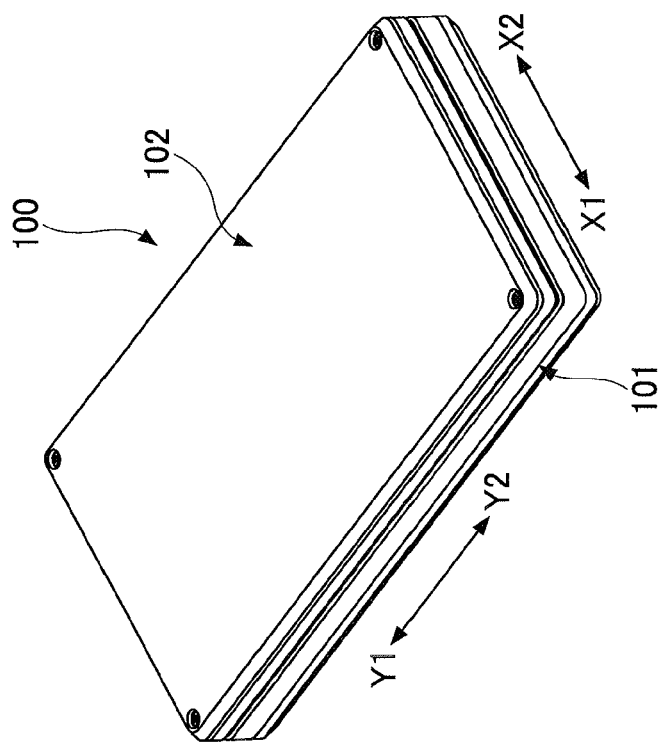

FIGS. 4A to 6B are views for explaining operation of the slide/tilt mechanism 10. FIGS. 4A, 5A and 6A show operation of the electronic device 100 incorporating the slide/tilt mechanism 10, and FIGS. 4B, 5B and 6B show operation of the slide/tilt mechanism 10.

FIG. 4A shows a state of the electronic device 100 in which the first housing 101 and the second housing 102 are overlapped. The electronic device 100 in this state may be carried. At this time, as shown in FIG. 4B, the slide/tilt mechanism 10 is in a state in which the slide plate 30 is slid in the X1 direction relative to the base plate 20. In the following, a position where the slide plate 30 is slid in the X1 direction will be called a closed position, and a condition of the slide/tilt mechanism 10 at this time will be called a closed condition.

In the closed condition, the guide pin 80 is located at the end of the slide groove 32 in the X2 direction, and the flange part 81 of the guide pin 80 is engaged with the slide plate 30. The engaging pin 75 is located at the end of the slot 24 in the X1 direction. Further, in the closed condition, the torsion spring 60 exerts the elastic force to actuate the slide plate 30 both in the X1 direction (the slide direction) and the Z1 direction (the tilt direction).

FIG. 7 shows the tilt mechanism in the closed condition. In the closed condition, the link member 70 is rotated in the A2 direction and laid along the bottom surface of the base plate 20. In this state, the sliding contact surface 78 of the link member 70 is in contact with the back surface of the tilt restricting plate 50 (see FIG. 7).

As described above, the torsion spring 60 exerts the elastic force to actuate the slide plate 30 in the tilt direction (or in the Z1 direction) also, and the sliding contact surface 78 comes in contact with the tilt restricting plate 50, thereby restricting the rotational movement of the link member 70. Hence, the inclination (tilt) of the slide plate 30 and the guide plate 40 relative to the base plate 20 is prevented even if the actuating force in the Z1 direction by the torsion spring 60 acts on the slide plate 30.

In the closed condition, the body part 21 of the base plate 20 and the body part 40a of the guide plate 40 overlap each other and are set in parallel with each other. Hence, the slide plate 30 held by the guide plate 40 is also set in parallel with the body part 21 of the base plate 20. The slide plate 30 is held such that the slide plate 30 is slidable on the guide plate 40, and the slide plate 30, in the closed condition, is slid in the X1 or X2 direction in parallel with the base plate 20 (the body part 21).

In the closed condition, if a slide operation is performed to move the second housing 102 relative to the first housing 101 in the X2 direction, the slide plate 30 is also slid relative to the base plate 20 and the guide plate 40 in the X2 direction. At this time, the guide pin 80 is moved within the slide groove 32 in the X1 direction.

In conjunction with the sliding of the slide plate 30, the torsion spring 60 exerts the elastic force to actuate the slide plate 30 in the X1 direction until a position where the spring fixing pin 63 and the guide pin 80 are aligned along a straight line in the direction indicated by the arrow Y1 or Y2 is reached (which position will be called a spring force inversion position). Therefore, if the moving operation of the slide plate 30 is canceled before the spring force inversion position is reached, the slide plate 30 (the second housing 102) is elastically actuated by the torsion spring 60 and slid to the closed position.

On the other hand, if the moving operation is performed to move the slide plate 30 (the second housing 102) from the spring force inversion position to a position in the X2 direction, the elastic force of the torsion spring 60 is reversed in the direction (the X2 direction) to make the slide plate 30 open. After the slide plate 30 (the second housing 102) is moved from the spring force inversion position to the position in the X2 direction, the slide plate 30 (the second housing 102) is automatically slid in the X2 direction by the elastic force of the torsion spring 60. At this time, the link member 70 (the sliding contact surface 78) which constitutes the tilt mechanism is slid, while the state in which the link member 70 is in contact with the tilt restricting plate 50 is maintained.

FIGS. 5A and 5B show the state in which the slide plate 30 is moved relative to the base plate 20 until an end position thereof in the X2 direction is reached. In the following, a position where the slide plate 30 is slid to the end position in the direction X2 will be called an open position, and a condition of the slide/tilt mechanism 10 at this time will be called an open condition.

As described above, the slide plate 30 is slid between the closed position and the open position. When the slide plate 30 is slid between the closed position and a position immediately before the open position, the state of the tilt mechanism in which the link member 70 is in contact with the tilt restricting plate 50 is maintained. Hence, the inclination of the guide plate 40 with respect to the base plate 20 is regulated.

However, if the slide plate 30 is moved to reach the open position, the guide pin 80 is disengaged from the slide groove 32 and enters the inside of the wide area 33 as shown in FIG. 2 and FIG. 5B. Therefore, if the slide plate 30 is tilted, the body part 31 of the guide pin 80 is engaged with the slide plate 30, and the restriction of the inclination of the guide plate 40 is canceled.

When the slide plate 30 is moved to reach the open position, the link member 70 (which constitutes the tilt mechanism) is disengaged from the link member engaging part 50a of the tilt restricting plate 50 and located within the tilt restriction canceling part 51. The tilt restriction canceling part 51 is a cut-out portion formed in the tilt restricting plate 50 as described above. The link member 70 at this time is rotatable around the support pin 74 in the A1 direction. Further, as described above, the torsion spring 60 is arranged to elastically actuate the slide plate 30 in the tilt direction (or the Z1 direction).

As described above, the torsion spring 60 is fixed at one end portion 61 thereof to the slide plate 30, and fixed at the other end portion 62 thereof to the guide pin 80 which is fixed to the base plate 20. Hence, the slide plate 30 is elastically actuated to the base plate 20 through the guide pin 80 in the tilt direction by the elastic force of the torsion spring 60.

In the open condition, the guide pin 80 is located in the wide area 33 and the link member 70 is disengaged from the tilt restricting plate 50 and located in the tilt restriction canceling part 51 (a cut-out portion). Hence, when the slide plate 30 is moved to the open position, there is no component part for restricting the movement of the slide plate 30 in the tilt direction.

Therefore, the slide plate 30 is actuated in the tilt direction by the torsion spring 60. As described above, the slide plate 30 is held by the slide holding part 43 of the guide plate 40. Hence, the slide plate 30 is actuated in the tilt direction and rotated around the support pin 74 in the A1 direction. As shown in FIG. 8, the link member 70 at this time stands upright with respect to the base plate 20. In this connection, the engaging pin 75 fixed to the guide plate 40 is moved within the slot 24 in the X2 direction.

By the above-described operation, the guide plate 40 is tilted around the center of the engaging pin 75 with respect to the base plate 20, and the slide plate 30 held by the guide plate 40 is inclined with respect to the base plate 20. FIGS. 6B and 8 show the state in which the slide plate 30 is tilted with respect to the base plate 20. In the following, a position in which the slide plate 30 is tilted from the open condition will be called a tilted position, and a condition of the slide/tilt mechanism 10 at this time will be called a tilt condition.

In the tilt condition, as shown in FIG. 8, the support pins 73 and 74 are arrayed in the vertical direction (in the Z1 or Z2 direction). The engaging part 77 which is formed in the end portion of the link member 70 where the support pin 73 is disposed faces the edge portion 53 which constitutes a part of the tilt restriction canceling part 51 of the tilt restricting plate 50. The engaging pin 75 is located at the end of the slot 24 in the X2 direction.

The link member 70 which constitutes the tilt mechanism is in the state in which the link member 70 stands upright with respect to the base plate 20. The support pin 73 which supports the guide plate 40 and the link member 70 is in a position which is higher than a position of the support pin 74 which supports the base plate 20 and the link member 70. The guide plate 40 at this time is rotatable around the engaging pin 75 which is engaged with the slot 24. Therefore, the link member 70 is rotated in the A1 direction and the guide plate 40 is tilted with respect to the base plate 20 around the engaging pin 75.

When the guide plate 40 is tilted with respect to the base plate 20, the slide plate 30 held by the guide plate 40 is also tilted with respect to the base plate 20. Thereby, the slide plate 30 is tilted with respect to the base plate 20. In this embodiment, the slide plate 30 is tilted with respect to the base plate 20 by the angle $\theta$ (see FIGS. 6 and 8).

Accordingly, when the slide plate 30 is tilted with respect to the base plate 20, the second housing 102 is tilted with respect to the first housing 101 as shown in FIG. 6A. For example, in a case in which a liquid crystal display part is disposed in the second housing 102, it is possible to provide increased visibility of an image displayed.

In the foregoing description, for the sake of convenience, operations to move the slide plate 30 to the open position and operations to move the slide plate 30 from the open position to the tilted position are separately discussed. Practically, however, the operation of the slide plate 30 is carried out by continuously performing the slide operation in the X2 direction and the tilt operation in the direction toward the tilted position. Namely, after the moving operation is performed to move the slide plate 30 in the X2 direction to a position exceeding the spring force inversion position by a certain amount, the slide plate 30 is automatically slid in the X2 direction to reach the open position, and the tilt operation is continuously performed thereafter.

According to the slide/tilt mechanism 10 of the above-described embodiment, immediately after the moving operation is performed to move the slide plate 30 to the position exceeding the spring force inversion position, the slide operation and the tilt operation can be performed continuously and automatically, and it is possible to provide increased operability for a user.

The slide operation to move the slide plate 30 from the closed position to the open position (practically, to the position immediately before the open position) is performed in the state in which the link member 70 is in contact with the tilt restricting plate 50 and the flange part 81 of the guide pin 80 is engaged with the slide groove 32. Hence, the slide operation of the slide plate 30 from the closed position to the open position is very stable, and rattling does not take place even if the slide plate 30 is capable of performing the tilt operation.

Even if an external force to actuate the slide plate 30 in the slide direction (the X1 direction) is exerted on the slide plate 30 which is in the tilt condition tilted, the edge portion 53 of the tilt restriction canceling part 51 formed in the tilt restricting plate 50 is in contact with the link member 70, as shown in FIG. 8, and the movement (slide) of the slide plate 30 in the X1 direction is regulated. Hence, in the slide/tilt mechanism 10 of the above-described embodiment, even if an external force acts in the slide direction, the slide plate 30 in the tilt condition does not slide.

On the other hand, when the slide plate 30 is moved from the tilt condition to the closed position, the slide plate 30 in the tilt condition as shown in FIGS. 6 and 8 is moved in the direction indicated by the arrow R (a different direction from the slide direction X1). In the tilt condition, the engaging part 77 formed in the link member 70 faces the edge portion 53 of the tilt restriction canceling part 51. Hence, when the slide plate 30 is moved in the direction indicated by the arrow R (or in the direction in which the edge portion 53 approaches the engaging part 77), the edge portion 53 comes in contact with the engaging part 77.

By sliding the slide plate 30 in the R direction further, the engaging part 77 is actuated to the slide plate 30 and the link member 70 is rotated around the support pin 74 in the A2 direction. In this connection, the engaging pin 75 is moved within the slot 24 in the X1 direction, and the guide plate 40 is moved to approach the base plate 20.

With the sliding of the slide plate 30 in the R direction, the tilt restricting plate 50 fixed to the slide plate 30 is also moved in the R direction and the sliding contact surface 78 of the link member 70 is engaged with the back surface of the tilt restricting plate 50 soon. This causes the inclination of the slide plate 30 by the tilt mechanism to be regulated again. When the slide plate 30 is moved in the X1 direction to the position exceeding the spring force inversion position by a certain amount, the elastic actuating force of the torsion spring 60 is reversed, and thereafter the slide plate 30 is automatically moved to the closed position.

Thus, the operation to move the slide plate 30 in the tilt condition to the closed position can be performed only by sliding the slide plate 30 both in the R direction and the X1 direction, and it is possible to provide improved operability in such a case. Further, as described above, the sliding of the slide plate 30 from the open position to the closed position is carried out after the tilt condition of the slide plate 30 is canceled. Hence, the tilt condition is not easily canceled by application of an external force, and it is possible to provide increased reliability of the tilt mechanism.

The present disclosure is not limited to the above-described embodiments, and it is to be understood that variations and modifications may be made without departing from the scope of the present disclosure as claimed.

The present international application is based upon and claims the benefit of priority of Japanese Patent Application No. 2009-273956, filed on Dec. 1, 2009, the contents of which are hereby incorporated by reference in their entirety.

DESCRIPTION OF NOTATIONS

10 Slide/tilt Mechanism
20 Base Plate
21 Body Part
22 step Part
23 Bent Part
24 Slot
25 Bearing Part
26 Shaft Hole
27 Spring Fixing Hole
30 Slide Plate
31 Body Part
32 Slide Groove
33 Opening
34 Spring Fixing Part
35 Fixing Hole
36 Side Edge Part
40 Guide Plate
41 Upper Plate Half
42 Lower Plate Half
43 Slide Holding Part
44 Step Part
45 Bearing Part
46, 47, 71, 72 Shaft Holes
48 Insertion Hole
50 Tilt Restricting Plate
51 Tilt Restriction Canceling Part
60 Torsion Spring
63 Spring Fixing Pin
70 Link Member
73, 74 Support Pins
75 Engaging Pin
77 Engaging Part
78 Sliding Contact Surface
80 Guide Pin
81 Flange Part
82 Spring Fixing Washer
100 Electronic Device
101 First Housing
102 Second housing

The invention claimed is:

1. A slide and tilt mechanism comprising:
a base plate;
a slide plate which is slidable between a closed position and an open position relative to the base plate;
a guide plate which supports the slide plate to make the slide plate movable;
a tilt mechanism which tilts the slide plate relative to the base plate by inclining the guide plate relative to the base plate, the tilt mechanism comprising a link member having a first end portion rotatably supported by the base plate and a second end portion rotatably supported by the guide plate, wherein the guide plate is inclined relative to the base plate when the link member is rotated around a position where the link member is supported by the base plate, and the slide plate is inclined relative to the base plate by the link member;

an elastic member which actuates the slide plate relative to the base plate in a slide direction and actuates the slide plate relative to the base plate in a tilt direction, the elastic member having a first end portion fixed to the slide plate and a second end portion fixed to the base plate via a guide pin; and a tilt restricting member which is disposed on the slide plate, the tilt restricting member engaging the tilt mechanism to restrict the inclination of the guide plate relative to the base plate by the tilt mechanism when the slide plate is slid from the closed position to the open position, and when the slide plate is slid to reach the open position, the tilt restricting member disengaging the tilt mechanism to permit said rotation of the link member, thereby permitting the inclination of the slide plate relative to the base plate in the tilt direction by the tilt mechanism.

2. The slide and tilt mechanism according to claim 1, wherein the tilt mechanism further comprises:

a slot formed in the base plate to extend in the slide direction of the slide plate; and an engaging pin disposed on the guide plate to engage the slot.

3. The slide and tilt mechanism according to claim 1, wherein the slide plate includes a slide groove and an opening having a width larger than a width of the slide groove, the guide pin is disposed on the base plate to pass through an insertion hole formed in the guide plate and project above the slide groove and the opening, and the guide pin is moved within the slide groove when the slide plate is slid.

4. The slide and tilt mechanism according to claim 3, wherein the elastic member comprises a torsion spring, a first end of the torsion spring being fixed to the slide plate, and a second end of the torsion spring being fixed to the guide pin.

* * * * *